(12) United States Patent
Egerton et al.

(10) Patent No.: US 7,719,751 B2
(45) Date of Patent: May 18, 2010

(54) ELECTRICAL CONTACT TECHNIQUE FOR ELECTROCHROMIC WINDOWS

(75) Inventors: Peter Egerton, Windsor, CA (US); Drew Gaskell, Santa Rosa, CA (US)

(73) Assignee: Soladigm, Inc., Milpitas, CA (US)

( * ) Notice: Subject to any disclaimer, the term of this patent is extended or adjusted under 35 U.S.C. 154(b) by 114 days.

(21) Appl. No.: 12/212,482

(22) Filed: Sep. 17, 2008

(65) Prior Publication Data

US 2010/0067090 A1    Mar. 18, 2010

(51) Int. Cl.
G02F 1/155    (2006.01)
G02F 1/153    (2006.01)

(52) U.S. Cl. ..................... 359/271; 359/266
(58) Field of Classification Search .............. 359/265, 359/266, 269, 271
See application file for complete search history.

(56) References Cited

U.S. PATENT DOCUMENTS

| | | | |
|---|---|---|---|
| 5,076,673 A | 12/1991 | Lynam et al. | |
| 5,140,455 A | 8/1992 | Varaprasad et al. | |
| 5,142,407 A | 8/1992 | Varaprasad et al. | |
| 5,145,609 A | 9/1992 | Varaprasad et al. | |
| 5,151,816 A | 9/1992 | Varaprasad et al. | |
| 5,233,461 A | 8/1993 | Doman et al. | |
| 5,239,405 A | 8/1993 | Varaprasad et al. | |
| 5,340,503 A | 8/1994 | Varaprasad et al. | |
| 5,471,338 A | 11/1995 | Yu et al. | |
| 5,472,643 A | 12/1995 | Varaprasad et al. | |
| 5,500,760 A | 3/1996 | Varaprasad et al. | |
| 5,567,360 A | 10/1996 | Varaprasad et al. | |
| 5,668,663 A | 9/1997 | Varaprasad et al. | |
| 5,724,187 A | 3/1998 | Varaprasad et al. | |
| 5,805,330 A | 9/1998 | Byker et al. | |
| 5,953,150 A | 9/1999 | Smarto et al. | |
| 5,969,847 A | 10/1999 | Coleman et al. | |
| 5,985,184 A | 11/1999 | Lynam | |
| 5,995,271 A | 11/1999 | Zieba et al. | |
| 6,002,511 A | 12/1999 | Varaprasad et al. | |
| 6,045,643 A | 4/2000 | Byker et al. | |
| 6,055,089 A | 4/2000 | Schulz et al. | |
| 6,118,573 A * | 9/2000 | Kubo et al. | 359/266 |
| 6,143,209 A | 11/2000 | Lynam | |
| 6,154,306 A | 11/2000 | Varaprasad et al. | |
| 6,166,849 A | 12/2000 | Coleman et al. | |
| 6,204,953 B1 | 3/2001 | Zieba et al. | |
| 6,207,083 B1 | 3/2001 | Varaprasad et al. | |
| 6,244,716 B1 | 6/2001 | Steenwyk et al. | |
| 6,261,641 B1 | 7/2001 | Zieba et al. | |

(Continued)

Primary Examiner—William C Choi
(74) Attorney, Agent, or Firm—Joseph P. Curtin, L.L.C.

(57) ABSTRACT

A window assembly comprises a first conductive material layer, an electrochromic stack, a second conductive material layer and a seal. The first conductive material layer is formed on a substrate and comprises at least two zones electrically isolated from each other. The electrochromic stack is formed on a first selected zone of the first conductive material layer to overlap an edge of a second selected zone of the first conductive material layer. The second conductive material layer is formed on the electrochromic stack to overlap an edge of the second selected zone. A first bus bar is formed on the second selected zone to be within a sealed volume of the window assembly. A second bus bar is formed on the first selected zone to be outside the seal volume of the window assembly. The seal defines the sealed volume of the window assembly and seals the window assembly.

24 Claims, 7 Drawing Sheets

U.S. PATENT DOCUMENTS

| | | |
|---|---|---|
| 6,433,913 B1 | 8/2002 | Bauer et al. |
| 6,515,787 B1 | 2/2003 | Westfall et al. |
| 6,561,460 B2 | 5/2003 | Rukavina et al. |
| 6,783,099 B2 | 8/2004 | Rukavina et al. |
| 6,795,226 B2 | 9/2004 | Agrawal et al. |
| 6,822,778 B2 | 11/2004 | Westfall et al. |
| 6,853,472 B2 | 2/2005 | Warner et al. |
| 6,862,125 B2 | 3/2005 | Warner et al. |
| 6,995,891 B2 | 2/2006 | Agrawal et al. |
| 7,004,592 B2 | 2/2006 | Varaprasad et al. |
| 7,130,101 B2 | 10/2006 | Rukavina et al. |
| 7,133,181 B2 | 11/2006 | Greer |
| 7,173,750 B2 | 2/2007 | Rukavina |
| 7,202,987 B2 | 4/2007 | Varaprasad et al. |
| 7,248,392 B2 | 7/2007 | Rukavina et al. |
| 7,277,215 B2 | 10/2007 | Greer |
| 7,300,166 B2 | 11/2007 | Agrawal et al. |
| 7,317,106 B2 | 1/2008 | Warner et al. |
| 7,324,261 B2 | 1/2008 | Tonar et al. |
| 7,362,491 B2 | 4/2008 | Busick et al. |
| 2002/0021481 A1 | 2/2002 | Lin et al. |
| 2002/0041443 A1 | 4/2002 | Varaprasad et al. |
| 2002/0135881 A1 | 9/2002 | Rukavina et al. |
| 2004/0257633 A1 | 12/2004 | Agrawal et al. |
| 2007/0002422 A1 | 1/2007 | O'Shaughnessy |
| 2008/0074724 A1 | 3/2008 | Agrawal et al. |

* cited by examiner

ELECTRICAL CONTACT TECHNIQUE FOR ELECTROCHROMIC WINDOWS

BACKGROUND

The subject matter disclosed herein relates to dynamic windows, such as smart windows. More particularly, the subject matter disclosed herein relates to a technique for making electrical contact to a dynamic window, such as a dynamic Insulated Glass Unit (IGU) window assembly.

For a conventional dynamic IGU, the transparent conducting layer of an electrochromic pane is semi-hermetically sealed within the IGU and electrical contact must be made between the transparent conducting layer and the exterior of the sealed IGU. Conventional techniques for making the electrical contact involve using a fired, silk screened or soldered bus bar. FIG. 1 depicts a conventional dynamic IGU 100 in which a bus bar 101 runs underneath a seal 102 in order to provide an electrical connection to an Electrochromic (EC) coating layer 103. Bus bar 101 creates an electrical contact path to a top conducting layer (not indicated) formed on EC coating layer 103. The electrical path is completed through the stack of the electrochromic device to a bottom conductive layer 104 and then to a second bus bar 105 that is outside seal 102. Second bus bar 105 is connected back to a voltage source 106. Bus bar 101 allows an electrical contact to be made to the top of EC coating layer 103 from outside the sealed volume of IGU 100. EC coating layer 103 is too delicate for seal 102 to be attached directly to EC coating layer 103 so EC coating layer 103 cannot extend underneath and be available for electrical contact.

The breaching of seal 102 by bus bar 101 reduces the reliability of seal 102. FIG. 2 is a Pareto chart depicting a typical EC Absorptive Window Failure Mode Effects Analysis (FEMA) in a finished IGU product. FIG. 2 shows that failure of the primary seal at the bus bar is one of the highest risk reliability failure modes in a finished IGU product. Accordingly, if the breaching of the seal by the bus bar could be eliminated, one of the highest risk reliability failure modes in a finished IGU product could be eliminated.

BRIEF DESCRIPTION OF THE DRAWINGS

The subject matter disclosed herein is illustrated by way of example and not by limitation in the accompanying figures in which like reference numerals indicate similar elements and in which.

DETAILED DESCRIPTION

As used herein, the word "exemplary" means "serving as an example, instance, or illustration." Any embodiment described herein as "exemplary" is not to be construed as necessarily preferred or advantageous over other embodiments.

The subject matter disclosed eliminates a bus bar from running underneath the seal which, in turn, eliminates one of the highest risk reliability failure modes in a finished IGU product by utilizing a conducting substrate as a contact path for control signals in place of a conventional bus bar. Another benefit of the subject matter disclosed herein is that bus bars can take up shapes on more of the perimeter of the coating inside the volume which enhances performance of the electrical operation of the electrochromic (EC) stack.

Figure 1:
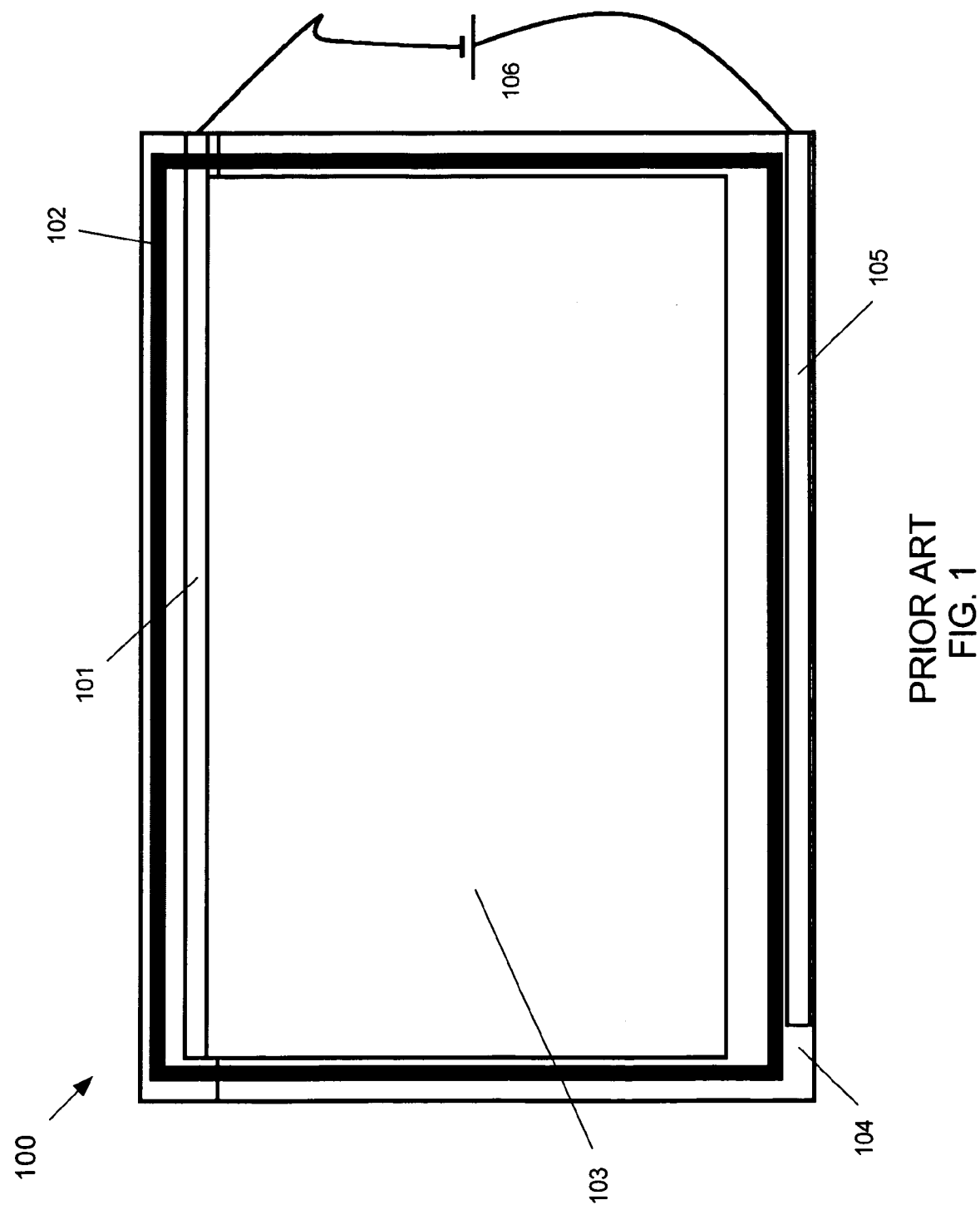
FIG. 1 depicts a conventional dynamic IGU in which a bus bar breaches a seal in order to provide an electrical connection to an Electrochromic (EC) coating layer.
Figure 2:
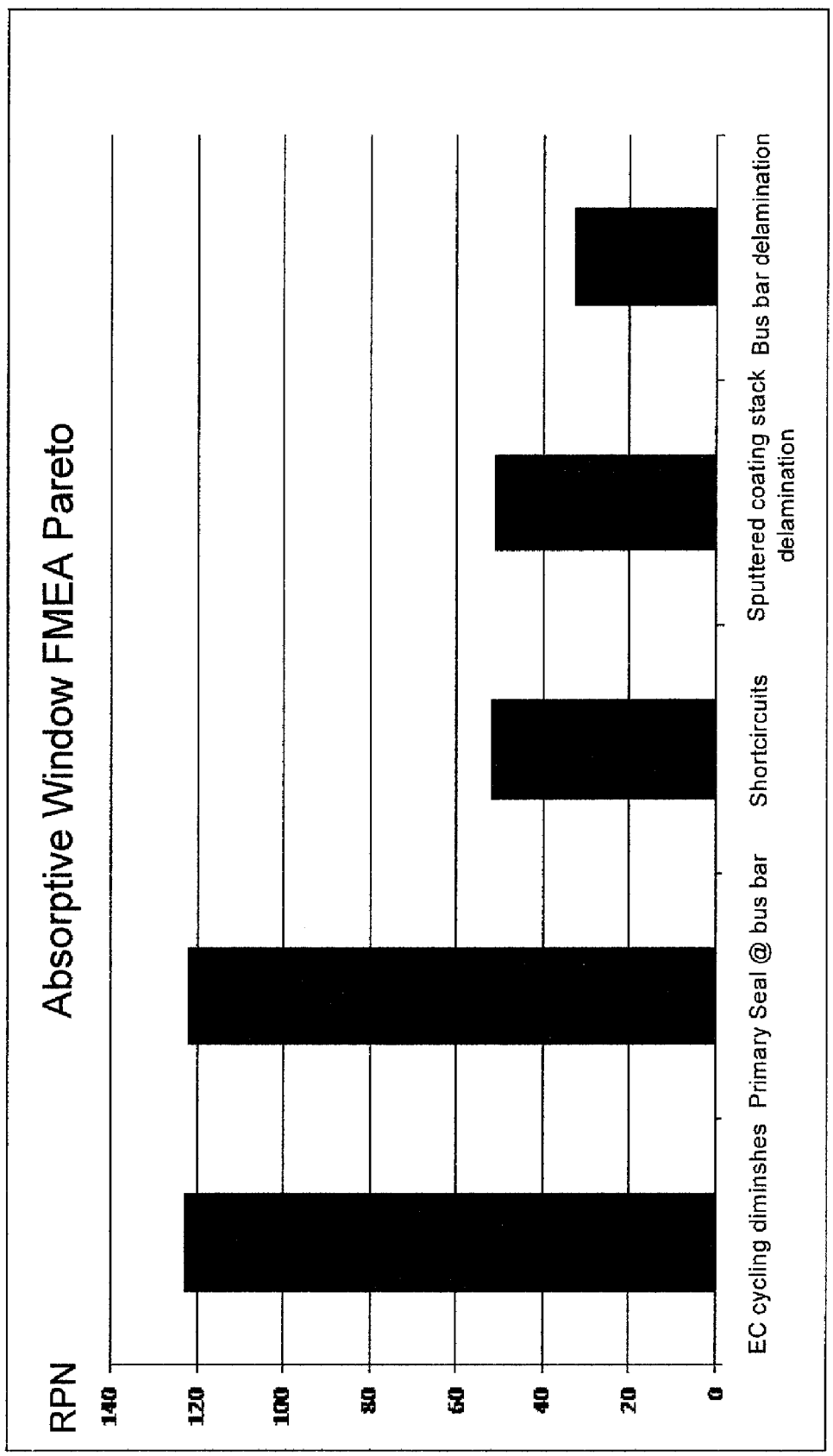
FIG. 2 is a Pareto chart depicting a typical EC Absorptive Window Failure Mode Effects Analysis (FEMA) in a finished IGU product.
Figure 3A:
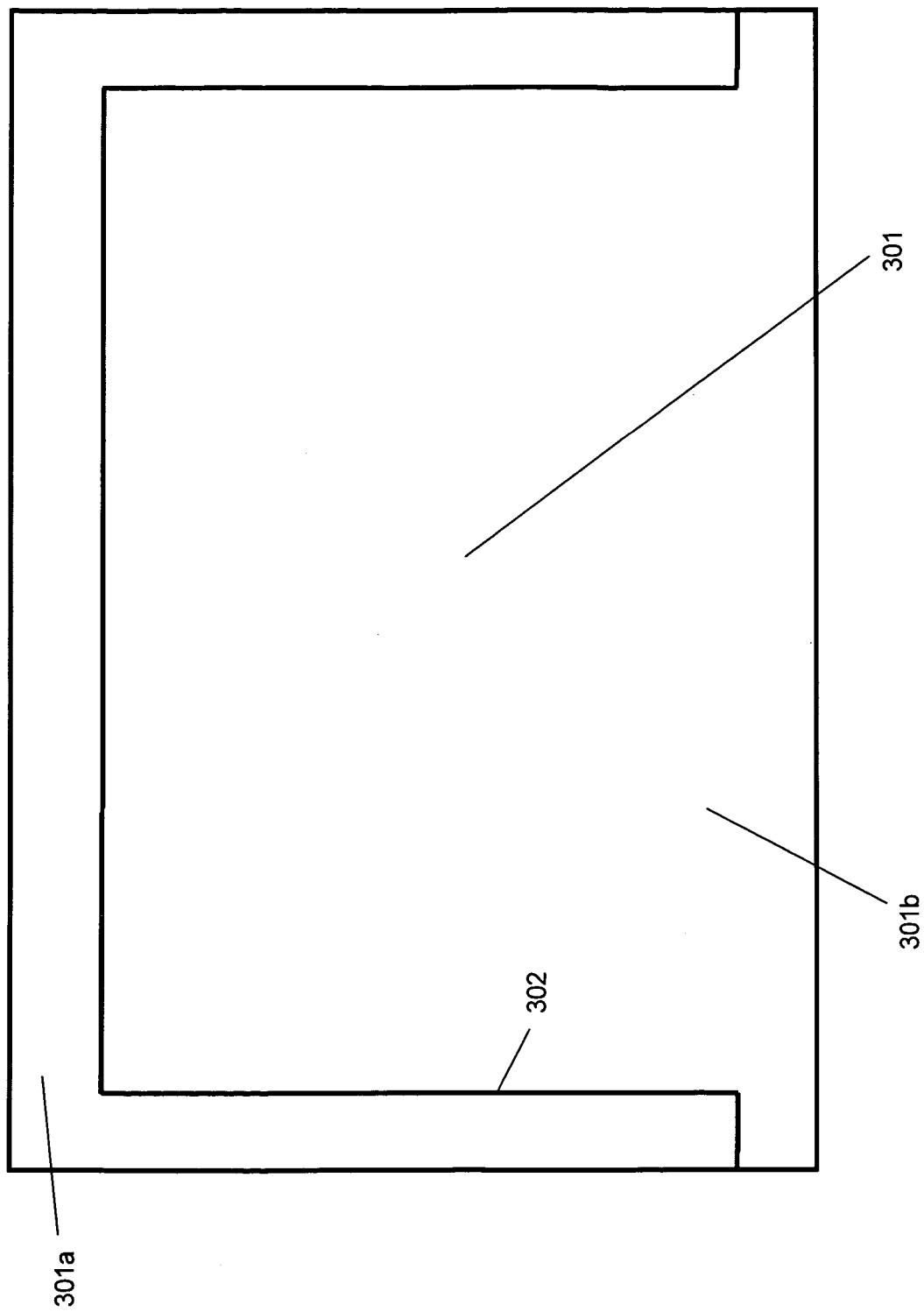
FIGS. 3A-3E depict a sequence of a technique for producing a dynamic IGU comprising a bus bar that provides an electrical connection to an Electrochromic (EC) coating layer without breaching the seal of the IGU according to the subject matter disclosed herein.

FIGS. 3A-3E depict a sequence of a technique for producing a dynamic IGU comprising a bus bar that provides an electrical connection to an Electrochromic (EC) stack without breaching the seal of the IGU according to the subject matter disclosed herein. FIG. 3A depicts a transparent substrate that has been coated in a well-known manner with a transparent conductive material layer 301. Suitable materials for conductive material layer 301 include, for example, fluorine-doped tin oxide ($SnO_2$:F, also abbreviated as FTO), Indium Tin Oxide (ITO), 80-90% indium oxide with a minor amount of ITO, and aluminum doped ZnO (ZnO:Al), sometimes abbreviated as AZO. The transparent substrate has not been indicated for clarity. It should be understood that the transparent substrate could be glass, acrylic or polycarbonate. Transparent conductive material layer 301 is formed into two electrically isolated zones, zones 301a and 301b, using a well-known technique, such as laser ablation to scribe an isolation line 302. Both conductive zones 301a and 301b on the substrate will act as a bus bar that passes beneath the primary seal thereby keeping the primary seal intact and eliminating one of the highest risk reliability failure modes in a finished conventional IGU product.

Figure 3B:
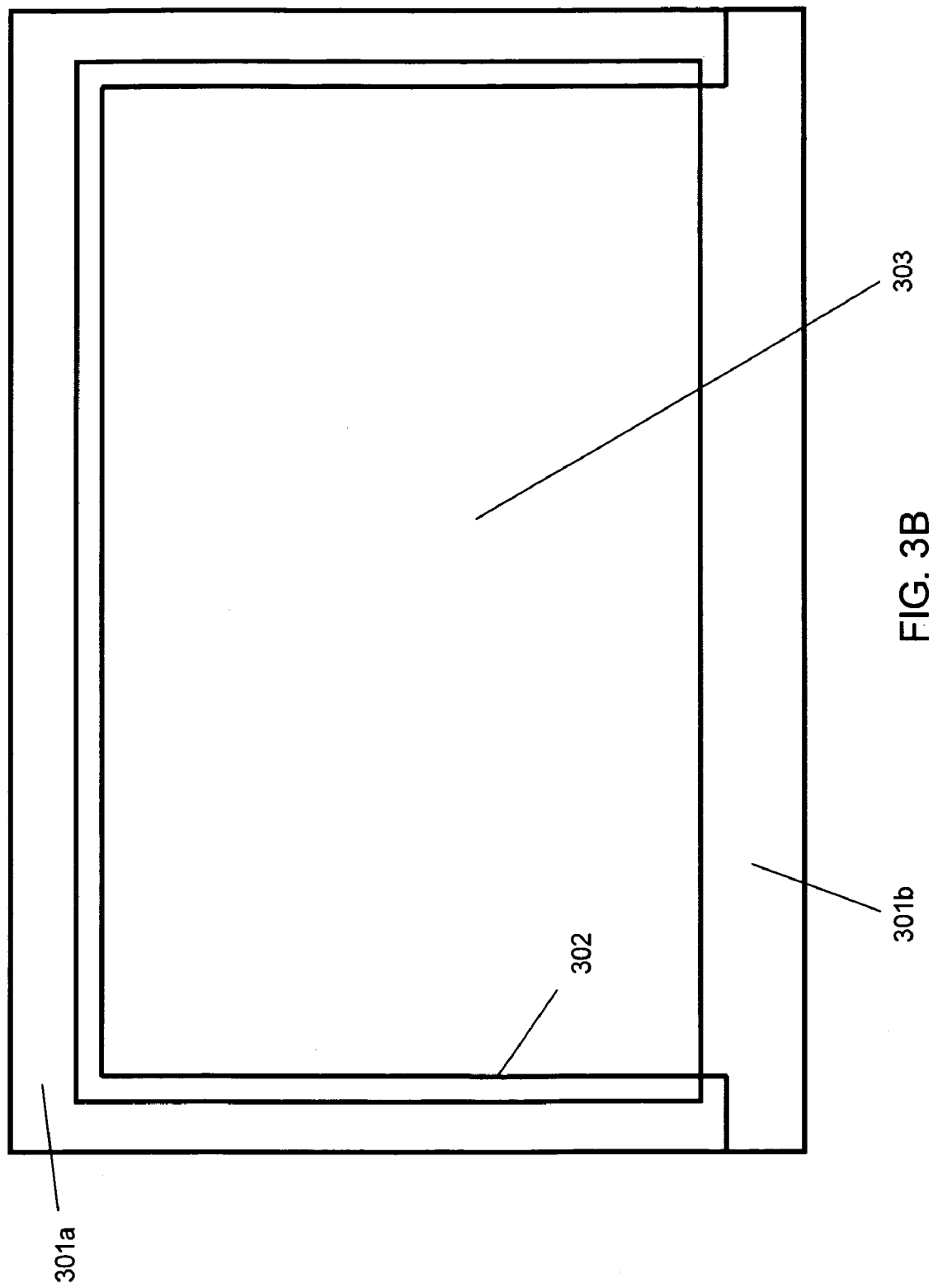

In FIG. 3B, an electrochromic stack is formed in a well-known manner on conductive material layer 301 in zone 301b so that stack 303 overlaps isolation line 302. A second transparent conductive material layer 303 is formed in a well-known manner on the electrochromic stack so that the second transparent conductive layer 303 overlaps isolation line 302. (The electrochromic stack is not shown in FIGS. 3B-3E for clarity, but it should be understood that the electrochromic stack is underneath second transparent conductive layer 303, as viewed in FIGS. 3B-3E.) Suitable materials for second conductive material layer 303 include, for example, FTO, ITO and AZO. In one exemplary embodiment shown in FIGS. 3B-3E, electrochromic stack comprises a counter electrode (CE) layer formed in a well-known manner on conductive material layer 301, an ion conductor (IC) layer formed in a well-known manner on the CE layer, and an electrochromic (EC) layer formed on the IC layer. In another exemplary embodiment, electrochromic stack comprises an electrochromic (EC) layer formed in a well-known manner on conductive material layer 301, an ion conductor (IC) layer formed in a well-known manner on the EC layer, and a counter electrode (CE) layer formed on the IC layer. Both exemplary embodiments of electrochromic stack 303 can be formed from well-known materials that are used for forming electrochromic stacks.

Figure 3C:
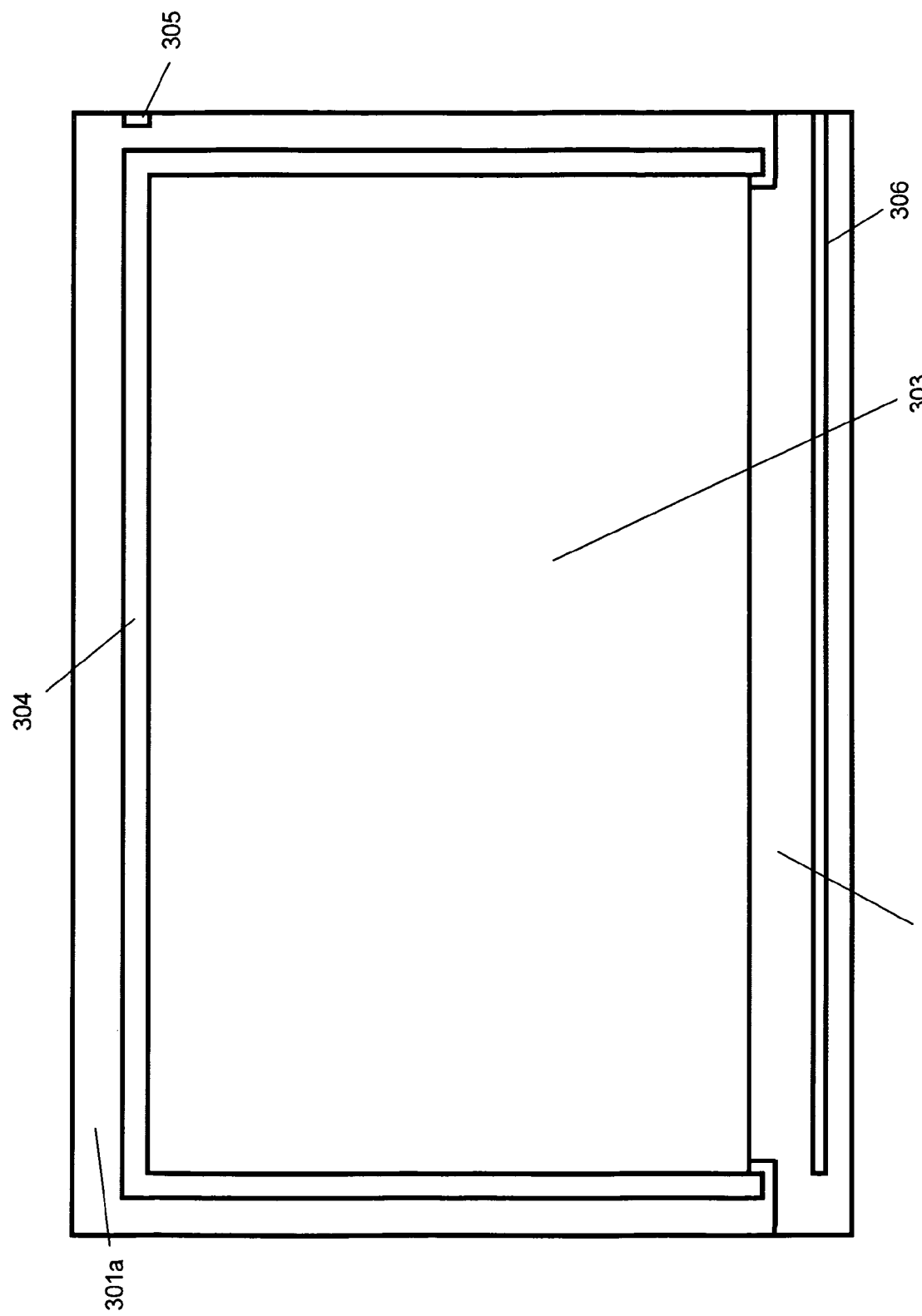

In FIG. 3C, a bus bar 304 is formed in a well-known manner, such as by ultrasonic soldering, so that it overlaps the edge of transparent coating 301 of zone 301a and to overlap edges of second transparent conductive layer 303 that overlaps zone 301a. Bus bar 304 is formed so that it will be within the sealed volume of the resulting IGU. Bus bar 304, when formed, shorts through the electrochromic stack, thereby creating a conductive path between first conductive material layer 301 and second conductive material layer 304. The short created when bus 304 is formed is in zone 301a so that the short is isolated from the operational portion of the electrochromic stack in zone 301b. A terminal contact 305 is formed in a well-known manner on transparent coating 301 in zone 301a in a place that will be outside of the sealed volume of the resulting IGU. The position, size and shape of terminal contact 305 is selected so that terminal contact 305 does not come into contact with and/or compromise the integrity of the seal (seal 307 in FIG. 3D) of the IGU. A bus bar 306 is formed in a well-known manner on transparent coating 301 in zone 301b in a place that will be outside of the sealed volume of the resulting IGU. Suitable materials for bus bars 304 and 306 include, for example, silver frit/fired paste and ultrasonic solder of various types.

Figure 3D:
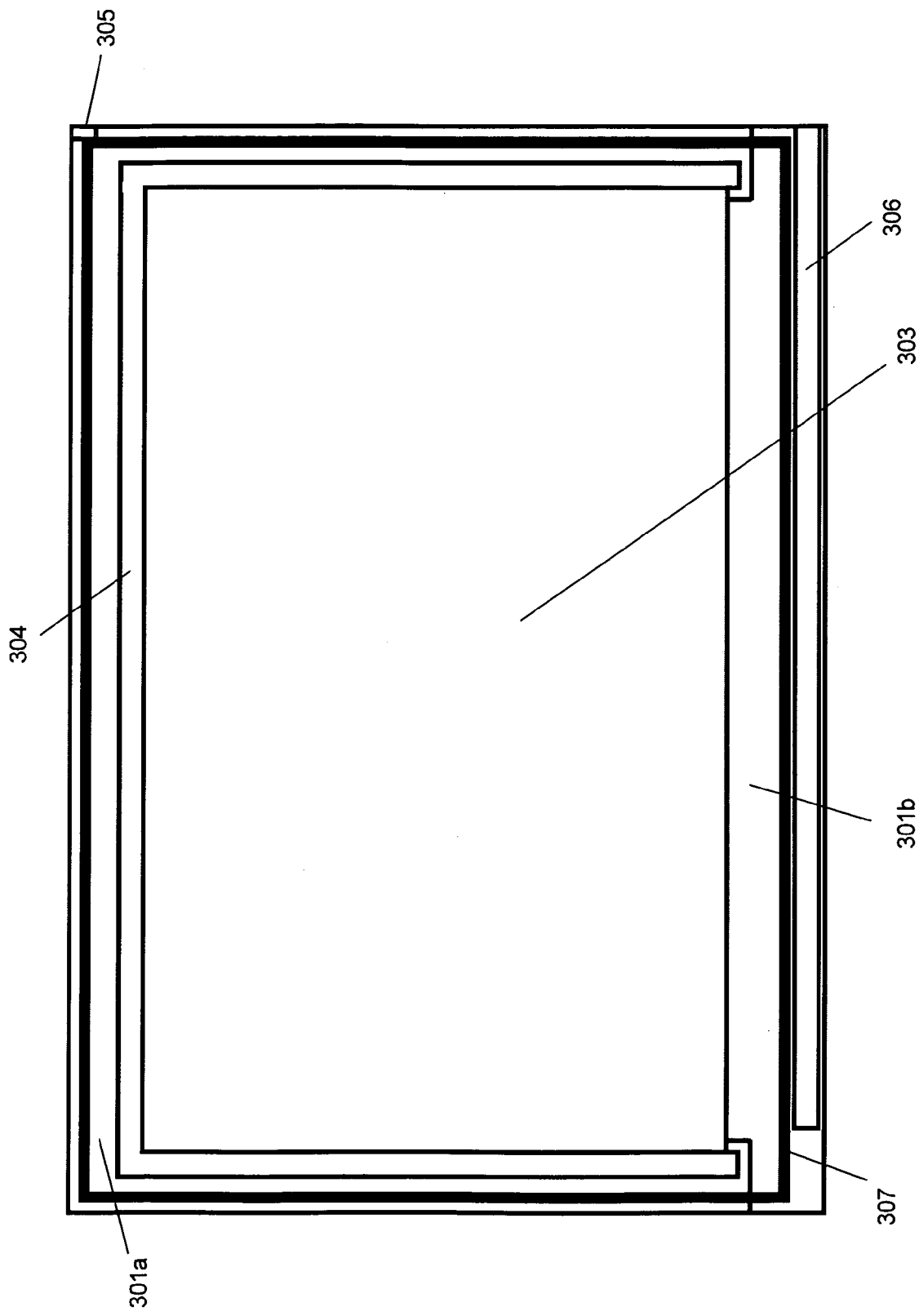
Figure 3E:
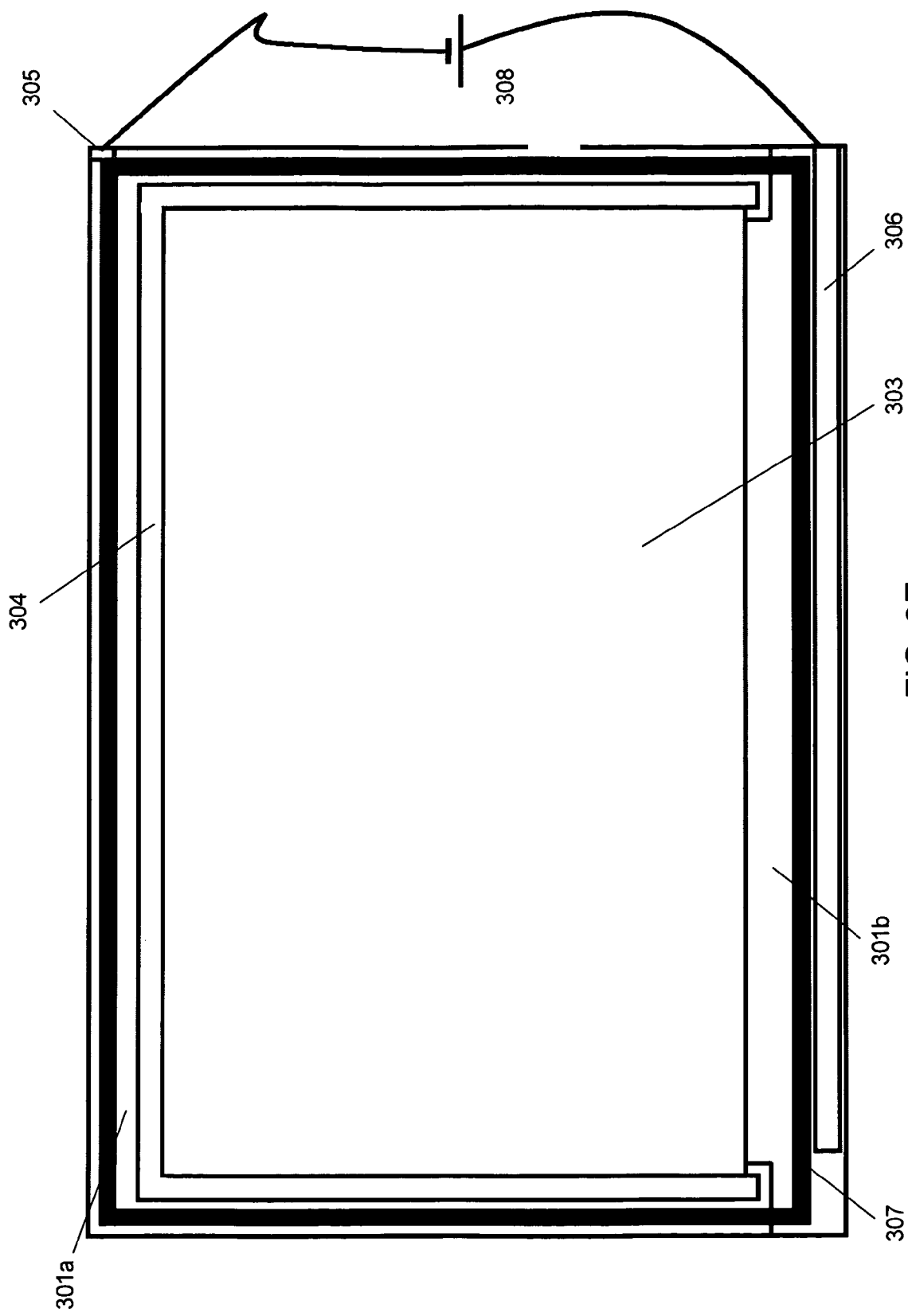

In FIG. 3D, a primary seal 307 is formed in a well-known manner on zones 301a and 301b so that bus bar 304 is entirely within the sealed volume and bus bar 306 is outside the sealed volume. A suitable material for primary seal 307 is polyisobutylene. In FIG. 3E, the IGU is finalized by trimming the substrate in a well-known manner. A voltage source 308 is connected to terminal contacts 305 and bus bar 306 to control in a well-known manner the transparency/reflectivity of the dynamic IGU.

While the exemplary embodiments disclosed herein are formed with two electrically isolated zones, it should be understood that more than two electrically isolated zones could be formed for a multi-zone dynamic IGU. Additionally, while the exemplary embodiments disclosed herein are formed so that the two conductive material layers cover substantially the same area as the electrochromic stack, it should be understood that at least one conductive material layer could be formed to cover an area that is substantially different from the area of the electrochromic stack. Further, an alternative exemplary embodiment provides that the electrochromic stack is formed so that it does not overlap the isolation line. For this alternative exemplary embodiment, an additional masking step is required to keep the electrochromic stack from overlapping the isolation line, while the second (or top) transparent conductive layer overlaps the isolation line. Yet another exemplary embodiment provides that the electrochromic stack overlaps one or more selected portions of the isolation line.

Although the foregoing disclosed subject matter has been described in some detail for purposes of clarity of understanding, it will be apparent that certain changes and modifications may be practiced that are within the scope of the appended claims. Accordingly, the present embodiments are to be considered as illustrative and not restrictive, and the subject matter disclosed herein is not to be limited to the details given herein, but may be modified within the scope and equivalents of the appended claims.

What is claimed is:

1. A window assembly, comprising:
    a first conductive material layer formed on a substrate, the first conductive material layer comprising at least two zones that are each electrically isolated from each other;
    an electrochromic stack formed on a first selected zone of the first conductive material layer to overlap at least an edge of a second selected zone of the first conductive material layer;
    a second conductive material layer formed on at least a portion of the electrochromic stack to overlap at least an edge of the second selected zone of the first conductive material layer;
    a first bus bar formed on the second selected zone of the conductive material layer, the first bus bar comprising a position that will be within a sealed volume of the window assembly; and
    a second bus bar formed on the first selected zone, the second bus bar comprising a position that will be outside the seal volume of the window assembly.

2. The window assembly according to claim 1, further comprising a seal defining the sealed volume of the window assembly.

3. The window assembly according to claim 1, wherein the electrochromic stack comprises:
    a counter electrode (CE) layer formed on the first conductive material layer in the first selected zone of the first conductive material layer;
    an ion conductor (IC) layer formed on the counter electrode (CE) layer; and
    an electrochromic (EC) layer formed on the ion conductor (IC) layer.

4. The window assembly according to claim 3, wherein the second conductive material layer is formed on the electrochromic (EC) layer of the electrochromic stack.

5. The window assembly according to claim 4, further comprising a seal defining the sealed volume of the window assembly.

6. The window assembly according to claim 1, wherein the electrochromic stack comprises:
    an electrochromic (EC) layer formed on the first conductive material layer in the first selected zone of the first conductive material layer;
    an ion conductor (IC) layer formed on the electrochromic (EC) layer; and
    a counter electrode (CE) layer formed on the ion conductor (IC) layer.

7. The window assembly according to claim 6, wherein the second conductive material layer is formed on the electrochromic (EC) layer of the electrochromic stack.

8. The window assembly according to claim 7, further comprising a seal defining the sealed volume of the window assembly.

9. A method, comprising:
    forming a first conductive material layer formed on a substrate, the first conductive material layer comprising at least two zones that are each electrically isolated from each other;
    forming an electrochromic stack on a first selected zone of the first conductive material layer to overlap at least an edge of a second selected zone of the first conductive material layer;
    forming a second conductive material layer on at least a portion of the electrochromic stack to overlap at least an edge of the second selected zone of the first conductive material layer;
    forming a first bus bar on the second selected zone of the conductive material layer, the first bus bar comprising a position that will be within a sealed volume of the window assembly; and
    forming a second bus bar on the first selected zone, the second bus bar comprising a position that will be outside the seal volume of the window assembly.

10. The method according to claim 9, further comprising forming a seal defining the sealed volume of the window assembly.

11. The method according to claim 9, wherein forming the electrochromic stack comprises:
    forming a counter electrode (CE) layer on the first conductive material layer in the first selected zone of the first conductive material layer;
    forming an ion conductor (IC) layer on the counter electrode (CE) layer; and forming an electrochromic (EC) layer on the ion conductor (IC) layer.

12. The method according to claim 11, wherein forming the second conductive material layer comprises forming the second conductive material layer on the electrochromic (EC) layer of the electrochromic stack.

13. The method according to claim 12, further comprising forming a seal defining the sealed volume of the window assembly.

14. The method according to claim 9, wherein forming the electrochromic stack comprises:
- forming an electrochromic (EC) layer on the first conductive material layer in the first selected zone of the first conductive material layer;
- forming an ion conductor (IC) layer on the electrochromic (EC) layer; and
- forming a counter electrode (CE) layer on the ion conductor (IC) layer.

15. The method according to claim 14, wherein forming the second conductive material layer comprises forming the second conductive material layer on the electrochromic (EC) layer of the electrochromic stack.

16. The window assembly according to claim 15, further comprising a seal defining the sealed volume of the window assembly.

17. A window assembly, comprising:
- a first conductive material layer formed on a substrate, the first conductive material layer comprising at least two zones that are each electrically isolated from each other;
- an electrochromic stack formed on at least a portion of a first selected zone of the first conductive material layer;
- a second conductive material layer formed on at least a portion of the electrochromic stack to overlap at least an edge of a second selected zone of the first conductive material layer;
- a first bus bar formed on the second selected zone of the conductive material layer, the first bus bar comprising a position that will be within a sealed volume of the window assembly; and
- a second bus bar formed on the first selected zone, the second bus bar comprising a position that will be outside the seal volume of the window assembly.

18. The window assembly according to claim 17, further comprising a seal defining the sealed volume of the window assembly.

19. The window assembly according to claim 17, wherein the electrochromic stack comprises:
- a counter electrode (CE) layer formed on the first conductive material layer in the first selected zone of the first conductive material layer;
- an ion conductor (IC) layer formed on the counter electrode (CE) layer; and
- an electrochromic (EC) layer formed on the ion conductor (IC) layer.

20. The window assembly according to claim 19, wherein the second conductive material layer is formed on the electrochromic (EC) layer of the electrochromic stack.

21. The window assembly according to claim 20, further comprising a seal defining the sealed volume of the window assembly.

22. The window assembly according to claim 17, wherein the electrochromic stack comprises:
- an electrochromic (EC) layer formed on the first conductive material layer in the first selected zone of the first conductive material layer;
- an ion conductor (IC) layer formed on the electrochromic (EC) layer; and
- an counter electrode (CE) layer formed on the ion conductor (IC) layer.

23. The window assembly according to claim 22, wherein the second conductive material layer is formed on the electrochromic (EC) layer of the electrochromic stack.

24. The window assembly according to claim 23, further comprising a seal defining the sealed volume of the window assembly.

* * * * *